June 15, 1943. W. W. HODGE 2,322,134
PROCESS FOR RECOVERY OF BY-PRODUCTS FROM WASTE PICKLE LIQUORS
Filed Sept. 29, 1939
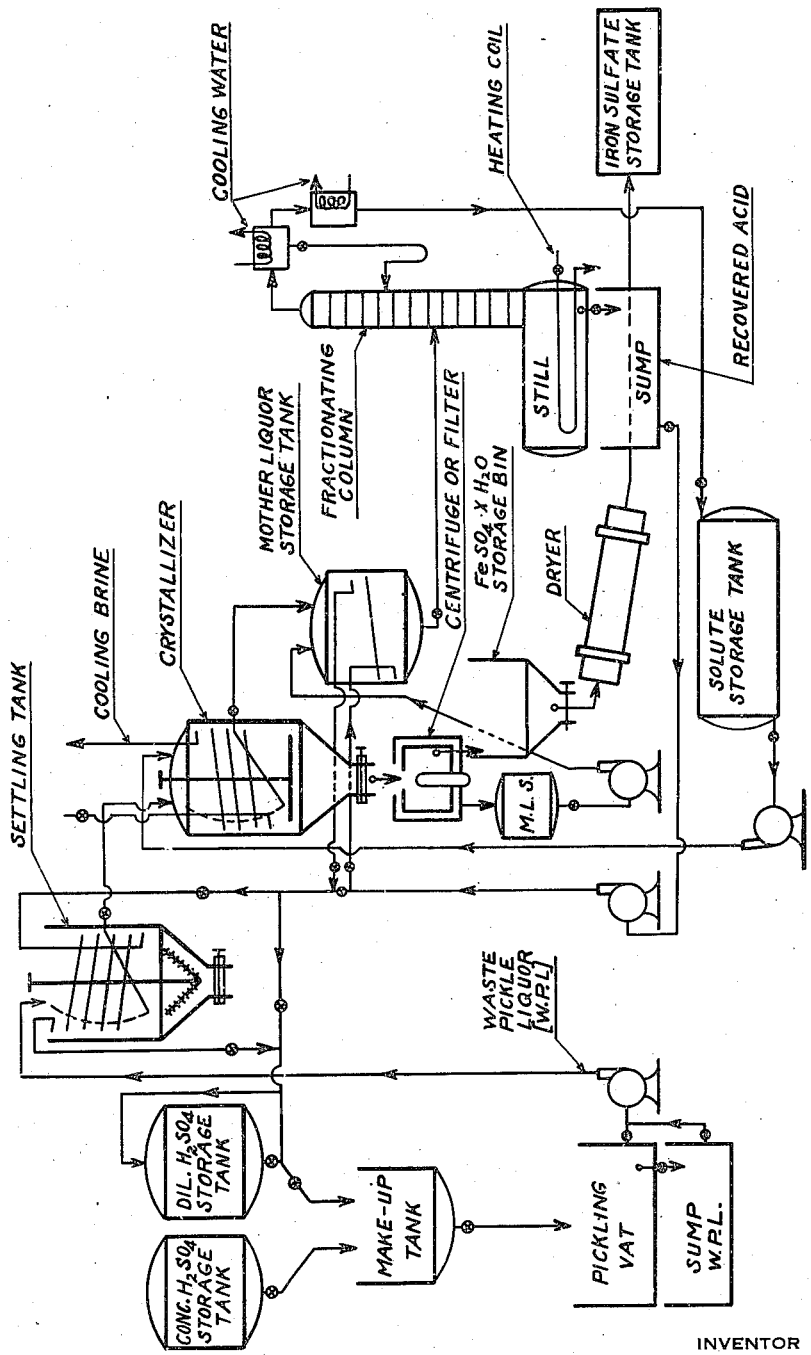
INVENTOR
Willard W. Hodge
by Christy and Wharton
his attorneys Patented June 15, 1943

2,322,134

UNITED STATES PATENT OFFICE 2,322,134

PROCESS FOR RECOVERY OF BY-PRODUCTS FROM WASTE PICKLE LIQUORS

Willard W. Hodge, Pittsburgh, Pa., assignor to Mellon Institute of Industrial Research, as trustee, a corporation of Pennsylvania Application September 29, 1939, Serial No. 297,133

2 Claims. (Cl. 23—126)

This invention relates to the pickling of metal; and consists in the reclaiming of spent pickling solutions by means of specific reagents to effect replacement of the solute. It is characteristic of such operations of regeneration that the replaced solute may be recovered, and such value as it possesses may be realized; and that the solution may be rendered serviceable again. This invention lies in the discovery of particular reagents that have peculiar utility in the premises, in that by their employment spent pickling solutions may with great facility be reclaimed, and in that, after reclamation, the solutions are highly effective. Their effectiveness is not impaired because of such trace or residue of the reagent as may remain unreacted within them.

The accompanying drawing is diagrammatic. It is a flow-sheet, illustrative of practice under the invention.

In the steel mills pickling with dilute sulfuric acid is common practice. The pickling operation involves a reaction whose product is iron sulfate. The iron sulfate as it is formed goes into solution in the pickling bath. As the bath continues in use the iron sulfate accumulates within it to the point where the correspondingly enfeebled acid ceases to be effective. The proposal has been made, though without practical effect, to reclaim such a pickling bath, when spent, by adding to it a reagent that, by replacement, shall release the dissolved iron sulfate. By my invention that proposal is made effective.

I have found that, by adding to such a spent pickling bath as that described acetone, $$(CH_3)_2CO$$

in proper quantity, substitution will occur, and the iron sulphate, replaced in the solution, will be precipitated, and will separate by gravity; the altered solution may readily be decanted; the still unreacted acid of the bath will be found to possess new efficacy; and in the renewed pickling operation the new solute formed by substitution will be found to be free of prejudicial effect. Both the released iron sulfate and the residual acetone may be recovered.

Operation may be conducted on laboratory scale as follows:

To 250 cc. waste pickle solution in a 1 litre flask 250 cc. of acetone are added. Both liquids are at the time at room temperature (29° C.). The liquids are thoroughly mixed by shaking. Almost immediately an abundant crop of light bluish green crystals appears; and a slight rise in temperature will be noted. The crystals quickly (within 10 minutes) settle to the bottom of the flask. The supernatant liquor is carefully decanted; the precipitate is subjected to filtration on a Büchner funnel with the aid of vacuum, and the liquor is separated and added to the decanted liquor.

The precipitate, taken from the Büchner funnel is pressed between dry filter papers, then air dried for about 1 hour, until the odor of acetone is no longer noticeable. Analysis will then show the precipitate to be either ferrous sulfate pentahydrate, known as siderotilate, $FeSO_4 5H_2O$, or the heptahydrate, $FeSO_4 7H_2O$, known as copperas.

The decanted liquor, without any addition of fresh acid, will attack an article of iron immersed in it. This decanted liquor, under distillation at atmospheric pressure, will render up a large portion of the acetone initially introduced. The residual liquor, after such distillation, will be found to be of a specific gravity exceeding 1, and to be strongly acid in reaction.

If, instead of proceeding at room temperature, the mixture of spent pickle liquor and acetone be maintained for several hours in a cold room (2° C.), it will be found that about half the quantity of acetone (125 cc.) will be effective, to precipitate most of the iron sulfate.

If, under the conditions of procedure first given, the quantity of acetone be reduced, a precipitate may be gained that, on analysis, will be found to be substantially ferrous sulfate heptahydrate, $FeSO_4.7H_2O$—that is to say, copperas or green vitriol.

In place of acetone, I have found acetic acid, $CH_3COOH$, to be serviceable, and with this advantage: that, whereas acetone in excess and unremoved does not restrain the activity of the residual sulfuric acid in solution; acetic acid, similarly present, contributes positively to the effectiveness of the residual sulfuric acid.

Other reagents that I have found to be effective are acetaldehyde, propionic acid, and ethyl acetate. All these substances are water soluble or may be made water soluble by blending; they are members of a class of organic compounds known as ketones, aldehydes, esters, and acids containing the carbonyl radical,

All the water-soluble members of this group that I have tried I have found to be effective to accomplish my end; and my experiments lead me to the conclusion that all ketones, aldehydes, esters, and acids that contain the carbonyl group and that are water soluble or those that may be made water soluble by addition of a blending solvent (for example acetone or ethyl alcohol) are so effective. These solutes may be used singly or mixtures of them may be used.

In like manner and with like effect these reagents may be added to spent pickling solutions generally. The accompanying drawing consists of a flow-sheet of the procedure of the invention. Referring to the drawing, the waste pickle liquor is pumped from the pickling vat, or from a storage sump below the vat, into the settling tank in which any suspended solid particles such as scale, rust, and dirt are settled out. The sensible heat in the spent pickle liquor may be used to preheat the recovered dilute acid which is pumped from the storage sump located below the still; this operation may aid in rapidly cooling the waste pickle liquor in the settling tank and so reduce the amount of cooling required in the crystallizer; or the waste pickle liquor or the recovered acid may be used to preheat the mother liquor in storage tank.

When the waste pickle liquor has become sufficiently clarified and cooled in the settling tank, the liquor is drawn into the crystallizer, and if necessary is then further cooled to a satisfactory temperature for the addition of the required quantity of differential solute. The solute is pumped from storage tank and is mixed with the clarified waste pickle liquor by means of the stirrer in the crystallizer; or the solute may be pumped into the crystallizer first and the waste pickle liquor allowed to flow into it, so that mixing takes place by gravity and splash and no stirrer is needed. The temperature of the mixture in the crystallizer is controlled by means of cooling brine circulating in coils or jackets installed in or on the crystallizer. If power and refrigeration are cheap it will be advisable to cool the mixture in the crystallizer to low temperature, perhaps to 1° to 2° C., but if refrigeration be costly it will be more economical to use a larger proportion of the differential solute and perform less cooling of the mixture in the crystallizer. This is a matter of relative costs and must be considered in connection with the costs for steam to heat the still for the recovery of the differential solute and the proportion of solute recoverable to that consumed in the substituent operation.

After the acetone and waste pickle liquor have been mixed in the crystallizer, the stirrer is stopped and the crystals of iron sulphate settle rapidly into the cone-shaped bottom of the crystallizer. The clear supernatant mother liquor is drawn off from the crystallizer into the mother liquor storage tank. The magma of crystalline precipitate is drawn from the bottom of the crystallizer into a centrifuge or filter, in which the precipitate is separated from the remaining mother liquor, which is then pumped into the mother liquor storage tank. The precipitate goes from the centrifuge or filter into a storage bin, or it may go directly to a dryer, in which the traces of mother liquor occluded on the surfaces of the crystals are driven off and the precipitate may be dried to whichever hydrate of iron sulfate is desired. In practice it will in some cases be desirable to install a solute recovery tower, to strip the solute from the exit gases from the dryer, depending on which differential solute or mixture is used in the process and the quantity of it remaining with the precipitate when the material enters the dryer. After leaving the dryer the precipitate is conveyed to storage bins for packing and sale, or to be used in the manufacture of other products, such as sulfuric acid and iron oxide, ammonium sulfate or other sulfates, wall-board, building blocks, and other usable materials.

The mother liquor in storage in tank may be preheated to a temperature satisfactory for feeding to the correct plate of the fractionating column of the still, and distilled or evaporated, and the vapors condensed and recovered. The preheating of the mother liquor in the tank may be accomplished by circulating through the heat exchanger coils in the tank the hot dilute acid discharged from the bottom of the still, or waste pickle liquor from the pickling vat or sump. The differential solute or mixture recovered by distillation and condensation in still and column and condenser flows into the tank for solute storage. This recovered solute may be pumped from tank into crystallizer and used over again, as required for the operation of the process. The water and sulfuric acid are refluxed down the fractionating column and collect in the bottom of still, from which they are drawn into the storage sump. This hot dilute acid may be pumped through heat exchanger coils or jackets in the mother liquor storage tank and the waste pickle liquor settling tank before flowing into storage tank, or the recovered dilute acid solution may be pumped directly to this storage tank. The recovered acid may be used with the addition to it of the correct proportion of fresh concentrated sulfuric acid, due caution being exercised in adding the concentrated acid, in making up the pickling solution for use in the picklers. The recovered acid may be used for other purposes.

The procedure as above described is of the nature of a batch operation. However, the flow sheet for the process may be easily modified and the plant design and equipment readily changed to adapt the process to continuous operation, if that system is better adapted to the pickling operations in the metallurgical plant.

I have in this specification described the regeneration of spent solutions that have been used in the pickling of steel articles, particularly. The invention is of wide and general utility, and may be practised upon the spent solutions of copper and brass pickling operations, for example, and the liquors resulting from the leeching of ores with sulphuric, hydrochloric, or other mineral acids.

In the flow sheet here presented the reuse of the recovered acid in the pickling operation is indicated. However, this recovered acid may be used for other purposes, and it is not the intent of this invention to limit the uses to be made of the recovered acid or other recovered by-products. Experiments have been carried out in which some of the recovered acid was neutralized with ammonium hydroxide; the precipitate formed was easily separated by settling and filtration. The filtrate was evaporated and ammonium sulfate was recovered. The precipitate could be calcined or sintered and charged into the iron and steel furnaces, and the ammonium sulfate sold as a fertilizer.

As previously stated, by proper design and operation of the drier different hydrates of ferrous sulfate may be obtained. The heptahydrate ferrous sulfate, or copperas, $FeSO_4.7H_2O$ and the pentahydrate, $FeSO_4.5H_2O$ are the iron sulfates used in sewage treatment, water purification, and for the manufacture of glass polishing rouge and paint pigments. Also, these compounds have some uses as insecticides, fungicides, and weed killers. The ferrous sulfate heptahydrate could also be used in the manufacture of wall-board, building blocks, and other building materials. The ferrous sulfate monohydrate, $FeSO_4 \cdot 1\frac{1}{2}H_2O$, or with less water of hydration is the ferrous sulfate from which sulfuric acid can be more readily manufactured. Hence it is apparent that the process may be so operated as to produce the by-product in whichever form is best suited for its utilization.

The water pickle liquors from metallurgical plants have in many localities for many past years constituted an objectionable form of stream pollution. The free acid in the waste pickle liquor kills fish and aquatic life in streams. The metallic sulfate hydrolyzes and oxidizes in the rivers, thus producing more sulfuric acid and also reddish brown deposits of ferric compounds on the banks of the streams. The rates of corrosion of the metallic parts of boats, barges, pipe lines, locks, and bridges are greatly increased by the acid water in streams. This process presents a method by which the waste pickle liquors may be kept out of the streams, thus reducing stream pollution; and, as has been said, produces from the waste pickle liquors valuable usable by-products.

In this application the operation of my invention is illustrated using the waste liquor from pickling ferrous metals, as an example. However, the invention is also applicable to liquors containing other metals as sulfates, such as copper sulfate, nickel sulfate, zinc sulfate, aluminum sulfate, and sodium sulfate.

I claim as my invention:

1. The method of reclaiming spent pickling solution containing ferrous sulfate which comprises effecting precipitation of ferrous sulfate from cold spent pickling solution by the addition of acetone, and separating the precipitate.

2. The method of reclaiming spent pickling solution containing ferrous sulfate which comprises effecting precipitation of ferrous sulfate from cold spent pickling solution by the addition of a water-soluble ketone, and separating the precipitate.

WILLARD W. HODGE.